US012308551B2

(12) United States Patent
Hsu et al.

(10) Patent No.: US 12,308,551 B2
(45) Date of Patent: May 20, 2025

(54) ELECTRICAL CONNECTOR HAVING AN ANGLED PART AND A U-SHAPED PLATE TOGETHER DEFINING A TUBULAR STRUCTURE

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Shuo-Hsiu Hsu, Phoenix, AZ (US); Tzu-Yao Hwang, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 376 days.

(21) Appl. No.: 17/887,571

(22) Filed: Aug. 15, 2022

(65) Prior Publication Data

US 2024/0055792 A1 Feb. 15, 2024

(51) Int. Cl.
*H01R 13/24* (2006.01)
*H01R 4/28* (2006.01)
*H01R 13/40* (2006.01)

(52) U.S. Cl.
CPC ......... *H01R 13/2442* (2013.01); *H01R 13/40* (2013.01); *H01R 4/28* (2013.01)

(58) Field of Classification Search
CPC ............ H01R 13/2442; H01R 13/2435; H01R 13/2492; H01R 13/40; H01R 13/405; H01R 13/41; H01R 4/28; H01R 13/432
See application file for complete search history.

(56) References Cited

U.S. PATENT DOCUMENTS

| | | | | |
|---|---|---|---|---|
| 8,091,222 | B2 | 1/2012 | Ironwood | |
| 9,954,312 | B1 | 4/2018 | Lotes | |
| 10,122,139 | B1 | 11/2018 | Ironwood | |
| 10,490,944 | B2 | 11/2019 | Lotes | |
| 10,651,584 | B2 | 5/2020 | Fit | |
| 11,152,732 | B2 * | 10/2021 | Ho | H01R 13/41 |
| 11,349,244 | B2 | 5/2022 | Fit | |
| 11,381,022 | B2 * | 7/2022 | Hsu | H01R 43/20 |
| 11,581,675 | B2 * | 2/2023 | Hwang | H01R 12/712 |
| 2021/0305754 | A1 * | 9/2021 | Ho | H01R 12/7082 |

FOREIGN PATENT DOCUMENTS

| | | | | |
|---|---|---|---|---|
| CN | 111987503 | B | | 1/2022 |
| CN | 114188746 | B | | 3/2022 |
| JP | 3108239 | U | * | 4/2005 |

* cited by examiner

*Primary Examiner* — Renee S Luebke
*Assistant Examiner* — Paul D Baillargeon
(74) *Attorney, Agent, or Firm* — Ming Chieh Chang

(57) ABSTRACT

An electrical connector includes: an insulative housing having plural passageways; and plural contacts secured in the plurality of passageways of the insulative housing, each of the plural contacts having an angled body, an upper arm and a lower leg extending from the angled body, and a U-shaped plate secured to the angled body; wherein the angled body has a first part, a second part bent from the first part, and a clip bent from the second part; and the U-shaped plate has a base, a first limb, and a second limb, the first limb is clamped between the first part and the clip, and the U-shaped plate and the second part of the angled body together form a tubular structure.

6 Claims, 7 Drawing Sheets

ELECTRICAL CONNECTOR HAVING AN ANGLED PART AND A U-SHAPED PLATE TOGETHER DEFINING A TUBULAR STRUCTURE

BACKGROUND OF THE INVENTION

Field of the Invention

The present invention relates to an electrical connector comprising: an insulative housing having a plurality of passageways; and a plurality of contacts secured in the plurality of passageways of the insulative housing, each of the plurality of contacts having an angled body, an upper arm and a lower leg extending from the angled body, and a U-shaped plate secured to the angled body to together define a tubular structure for improved high-frequency characteristic.

Description of Related Arts

Contacts for electrical connectors have given thickness and are usually made by stamping and forming planar contact stocks. Tubular contacts are preferred for increased coupling and decreased impedance in high-frequency applications as well as for better shielding effects. However, it is difficult and complicate to make contacts into desired tubular shapes by stamping and forming.

SUMMARY OF THE INVENTION

An electrical connector comprises: an insulative housing having a plurality of passageways; and a plurality of contacts secured in the plurality of passageways of the insulative housing, each of the plurality of contacts having an angled body, an upper arm and a lower leg extending from the angled body, and a U-shaped plate secured to the angled body; wherein the angled body has a first part, a second part bent from the first part, and a clip bent from the second part; and the U-shaped plate has a base, a first limb, and a second limb, the first limb is clamped between the first part and the clip, and the U-shaped plate and the second part of the angled body together form a tubular structure.

DETAILED DESCRIPTION OF THE DRAWINGS

Figure 1:
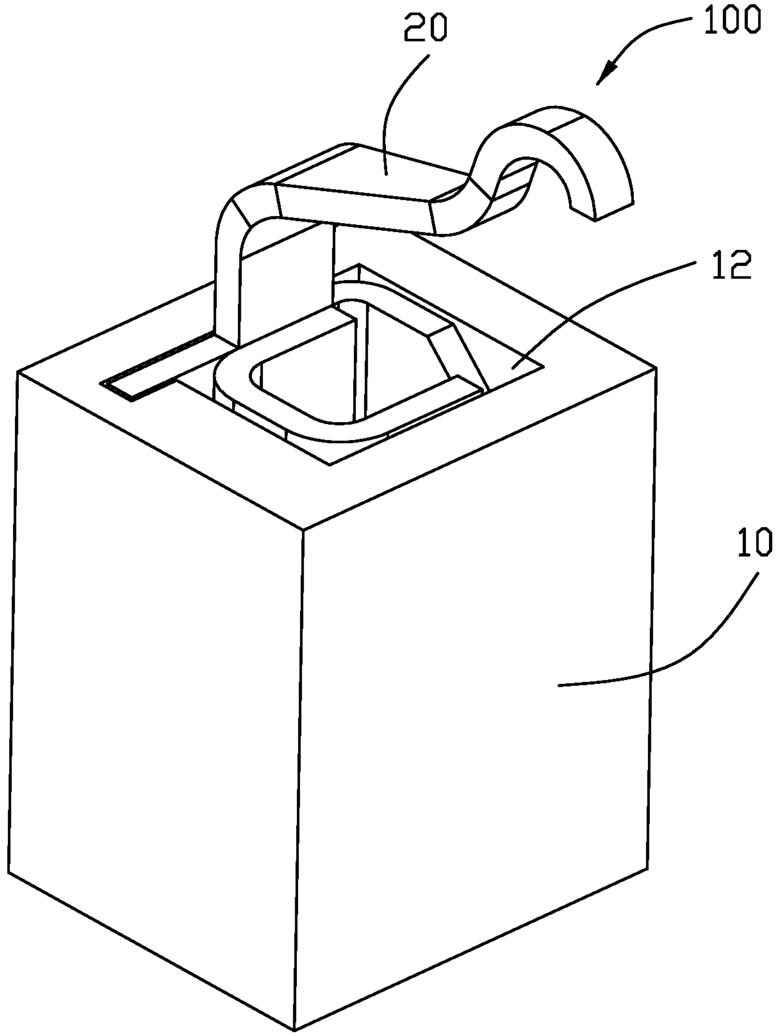
FIG. 1 is a perspective view of an electrical connector in accordance with the present invention.
Figure 2:
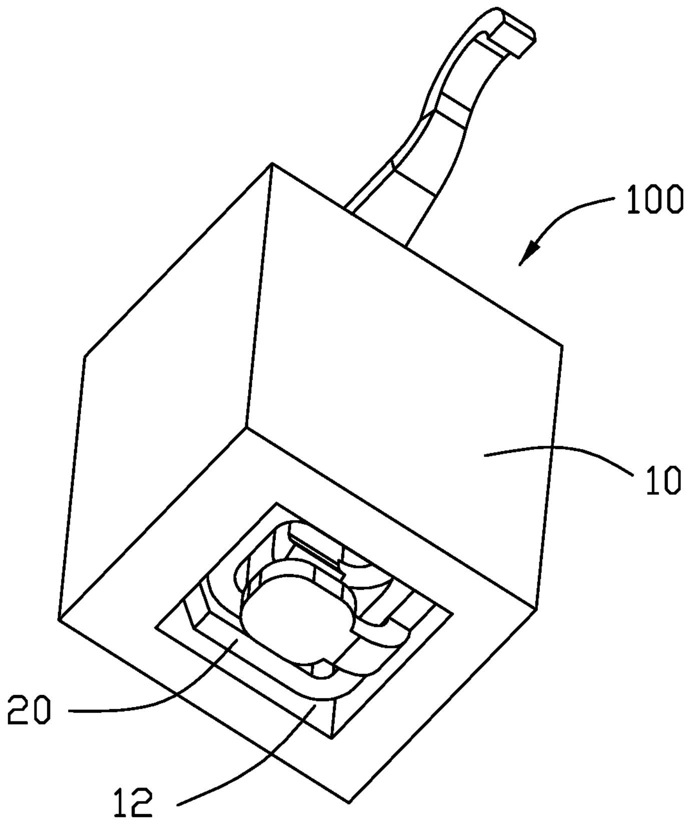
FIG. 2 is another perspective view of the electrical connector.
Figure 3:
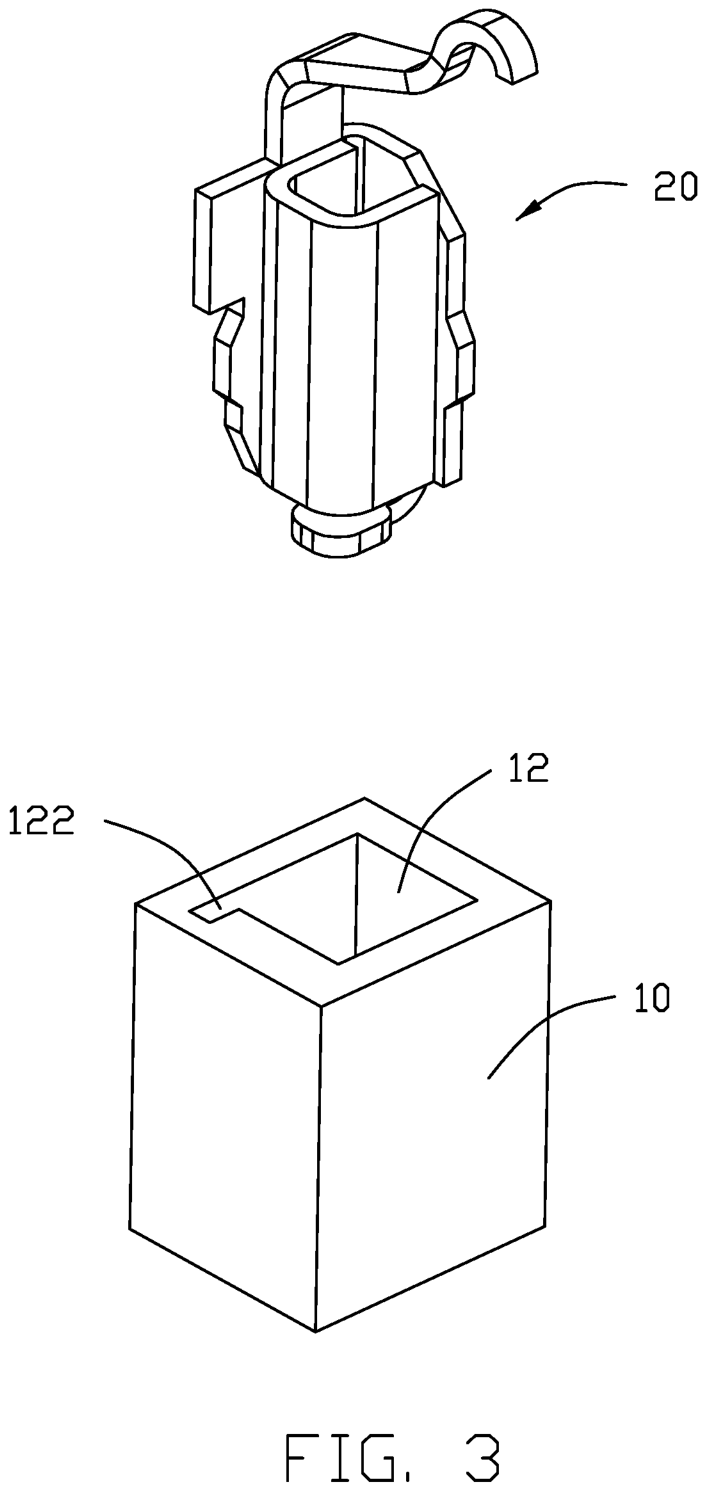
FIG. 3 is an exploded view of the electrical connector.
Figure 4:
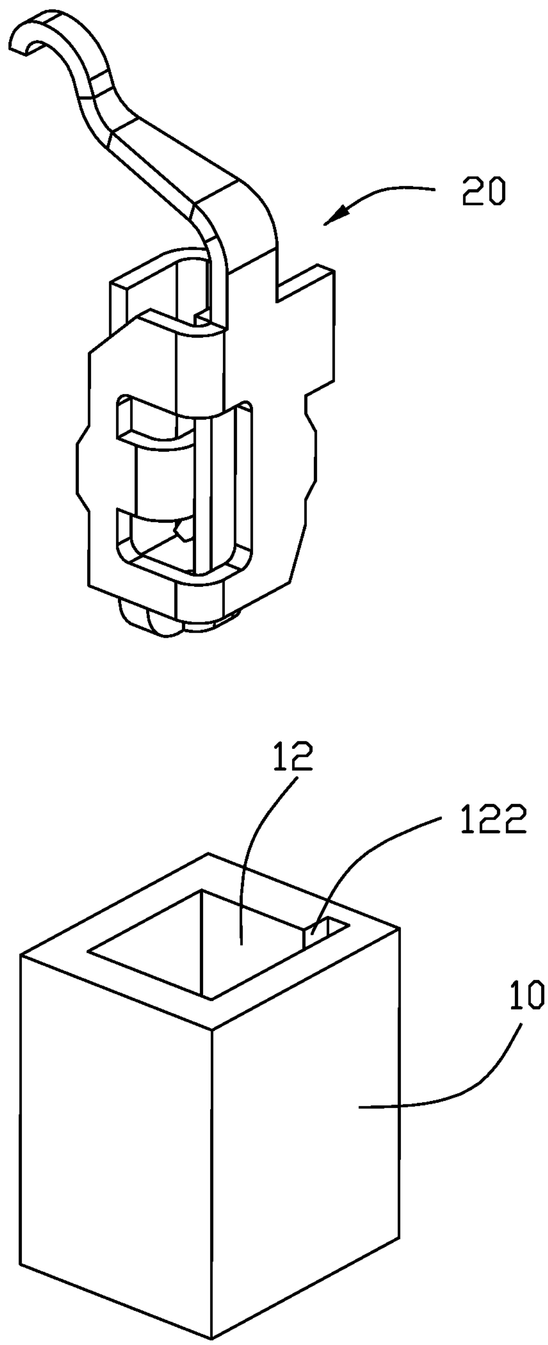
FIG. 4 is another exploded view of the electrical connector.
Figure 5:
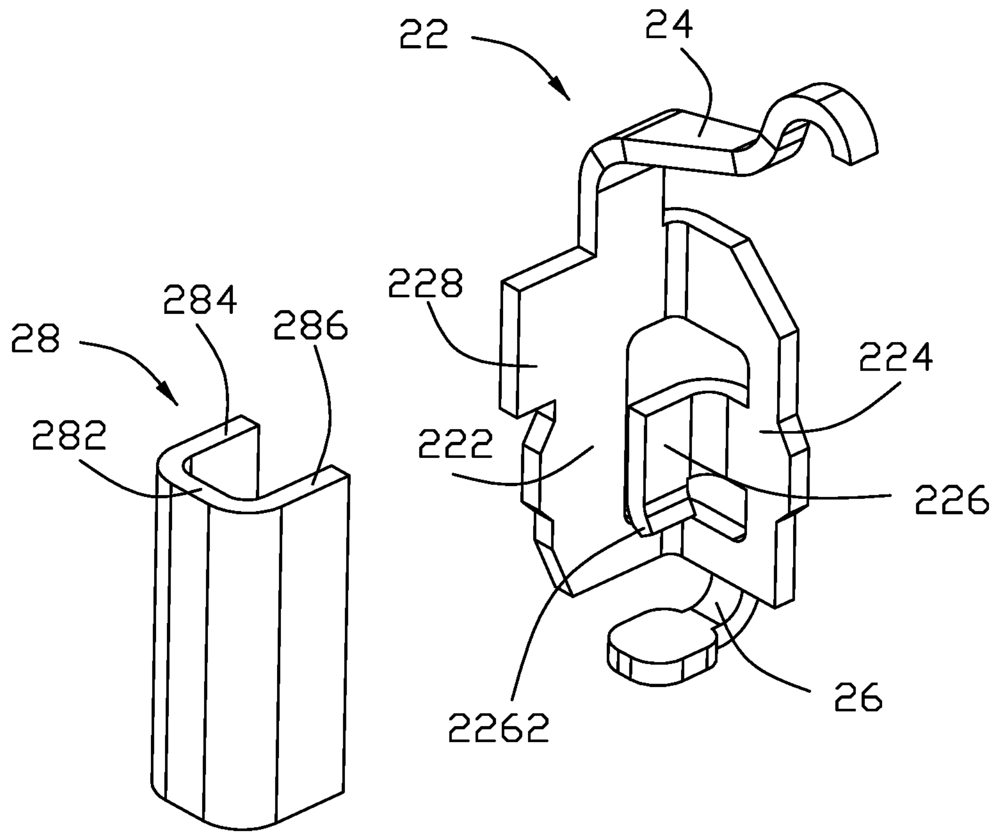
FIG. 5 is a further exploded view of a contact of the electrical connector.
Figure 6:
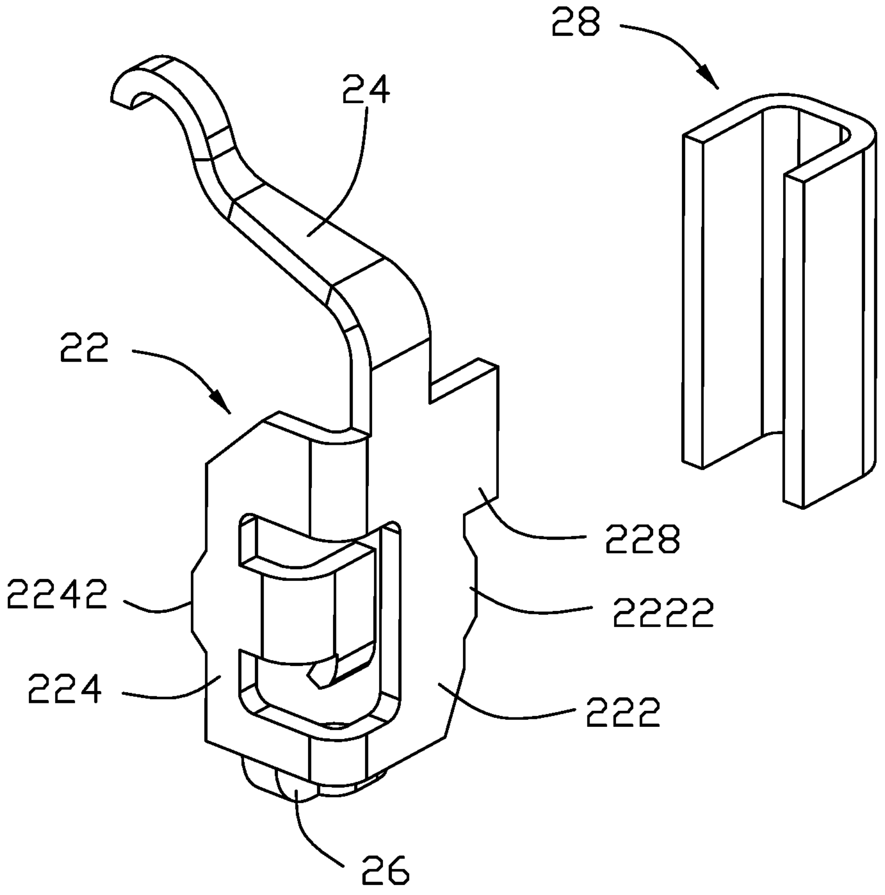
FIG. 6 is a view similar to FIG. 5 but from another perspective.
Figure 7:
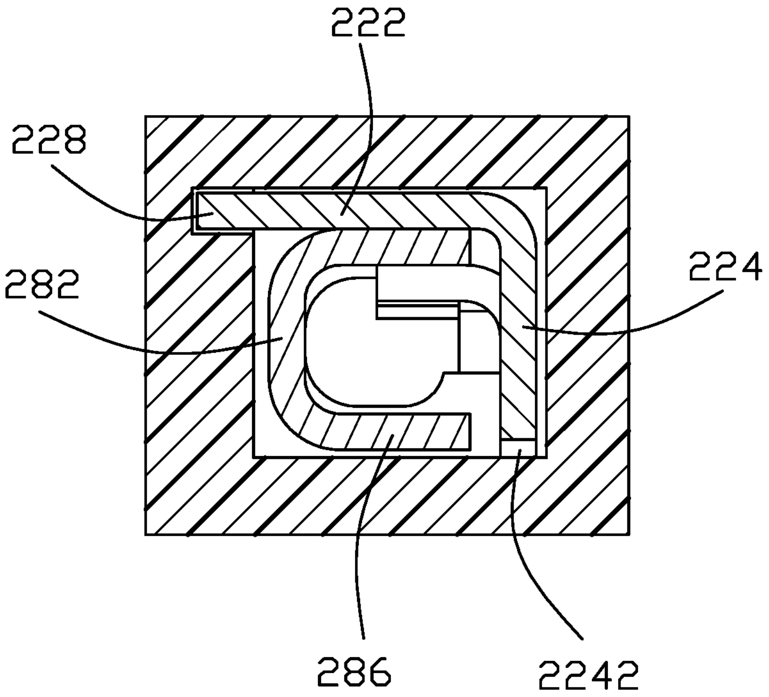
FIG. 7 is a cross-sectional view of the electrical connector.

Referring to FIGS. 1-7, an electrical connector 100 comprises an insulative housing 10 having a plurality of passageways 12 and a plurality of contacts 20 secured in the plurality of passageways 12 of the insulative housing 10. Each of the plurality of contacts 20 has an angled body 22, an upper arm 24 and a lower leg 26 extending from the angled body 22, and a U-shaped plate 28 separately made and then secured to the angled body 22. The insulative housing 10 shown depicts only schematically a part of an overall housing structure that may have hundreds of passageways arranged in rows and columns, as is well known in this art, e.g., a CPU socket connector housing.

Specifically, the angled body 22 has a first part 222, a second part 224 bent from the first part 222, and a clip 226 bent from the second part 224. The U-shaped plate 28 has a base 282, a first limb 284, and a second limb 286. The first limb 284 is clamped between the first part 222 and the clip 226. The U-shaped plate 28 and the second part 224 of the angled body 22 together form a tubular structure. The clip 226 may have a flared lower end 2262 for ease of mounting the U-shaped plate 28.

The U-shaped plate 28 is clear of, i.e., spacing a distance from, an inner wall surface of the passageway 12. The contact 20 is secured in the passageway 12 by a barb 2222 of the first part 222 and a barb 2242 of the second part 224 of the angled body 22. The angled body 22 may have a stopper 228 and the passageway 12 may have a step at a bottom of a slot 122 thereof so that an inserting or stitching depth of the contact 20 is regulated by engagement between the stopper 228 and the step.

The invention claimed is:

1. An electrical connector comprising:

an insulative housing having a plurality of passageways; and a plurality of contacts secured in the plurality of passageways of the insulative housing, each of the plurality of contacts having an angled body, an upper arm and a lower leg extending from the angled body, and a U-shaped plate secured to the angled body; wherein the angled body has a first part, a second part bent from the first part, and a clip bent from the second part; and the U-shaped plate has a base, a first limb, and a second limb, the first limb is clamped between the first part and the clip, and the U-shaped plate and the second part of the angled body together form a tubular structure.

2. The electrical connector as claimed in claim 1, wherein the U-shaped plate is spaced a distance from an inner wall surface of an associated passageway.

3. The electrical connector as claimed in claim 1, wherein each of the plurality of contacts is secured in a corresponding passageway by the first part and the second part of the angled body thereof.

4. The electrical connector as claimed in claim 1, wherein the angled body of each of the plurality of contacts has a stopper and a corresponding passageway has a step engaging the stopper.

5. An electrical connector comprising:

an insulative housing having a passageway; and a contact secured in the passageway of the insulative housing, the contact having an angled body, an upper arm and a lower leg extending from the angled body, and a U-shaped plate secured to the angled body; wherein the angled body has a first part, a second part bent from the first part, and a clip bent from the second part; and the U-shaped plate has a base, a first limb, and a second limb, the first limb is clamped between the first part and the clip, and the U-shaped plate and the second part of the angled body together form a tubular structure.

6. A contact for use in an electrical connector, comprising:
an angled body;
an upper arm and a lower leg extending from the angled body; and
a U-shaped plate secured to the angled body; wherein
the angled body has a first part, a second part bent from the first part, and a clip bent from the second part; and
the U-shaped plate has a base, a first limb, and a second limb, the first limb is clamped between the first part and the clip, and the U-shaped plate and the second part of the angled body together form a tubular structure.

* * * * *